March 12, 1957
J. N. WHALEN
2,784,963
VEHICLE SPRING MEMBER
Filed Jan. 6, 1956
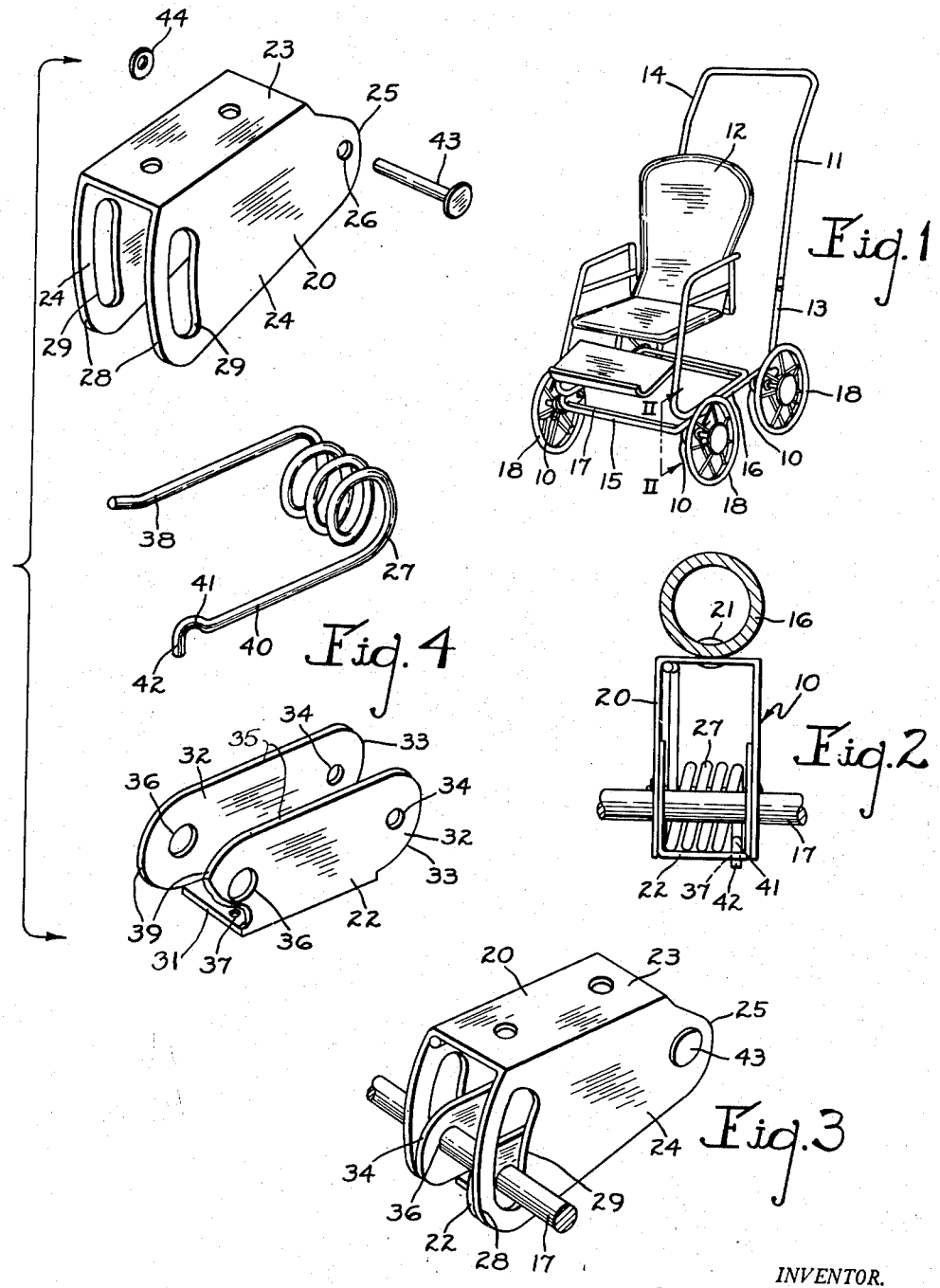
INVENTOR.
John N. Whalen
BY
Norman S. Blodgett
Attorney United States Patent Office 2,784,963
Patented Mar. 12, 1957

2,784,963

VEHICLE SPRING MEMBER

John N. Whalen, Whitinsville, Mass., assignor to Frank A. Bronzo, West Newton, Mass.

Application January 6, 1956, Serial No. 557,731

5 Claims. (Cl. 267—5)

This invention relates to a vehicle spring member and more particularly to a resilient element for insertion between the axle and the body of a wheeled vehicle.

In the past it has been known to use a torsion spring for connecting the frame of a baby stroller or the like to its axle. In general, such a torsion spring is a coiled spring in which the turns are well spaced and the ends of the spring are connected one to the frame and one to the axle in such a manner that relative movement between the frame and the axle results in a twisting of the spring about the axis of the coil. Such coils have the advantages of compactness, lightness, and low cost. However, considerable difficulty has been experienced with breakage of the springs, principally because it has been the practice to connect the spring ends to the respective frame or axle by passing the extreme end through an aperture; this type of connection results in abnormal loading of the spring, local stresses in the wire, in workhardening by repeated bending, and eventual failure. These and other disadvantages of the prior art have been obviated in a novel manner.

It is, therefore, an outstanding object of the invention to provide a vehicle spring member which is strong and durable, simple and inexpensive to manufacture, and capable of serving a long life of useful service.

It is another object of this invention to provide a vehicle spring member including a spring which is mounted to receive little localized stress or repeated bending.

A still further object of the instant invention is the provision of a spring member for baby strollers and the like which includes a resilient element which is not exposed.

It is another object of the present invention to provide a spring member to connect the frame and axle of a small vehicle, which member includes a coil spring which is stressed in torsion upon relative movement between the frame and the axle and which is fully supported and guided during such movement.

Another object of this invention is the provision of a vehicle spring member which includes a torsion spring, such that longitudinal relative movement or longitudinal loading is transmitted from the axle to the frame of the vehicle in such a manner that the spring is not subjected to this loading.

Another object of the invention is the provision of a vehicle spring member for use between the frame and the axle of a vehicle, which member includes a spring, means being provided for restricting the loading that is applied to the spring in either direction by limiting by mechanical means the amount of displacement of the axle from the frame from a normal position.

A still further object of the invention is the provision of a vehicle spring member, having a spring, in which the spring may be pre-loaded.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

Figure 1 is a perspective view of a vehicle embodying the principles of the present invention, Figure 2 is an enlarged sectional view of the invention taken on the line II—II of Figure 1, Figure 3 is a perspective view of the invention in its assembled form, and Figure 4 is an exploded view of the invention, showing the parts prior to assembly.

Like reference characters denote similar parts in the several figures of the drawings.

In the specification, the expressions "longitudinal" refers to the direction of movement of the vehicle, while "transverse" means a direction at a right angle thereto.

Referring first to Figure 1, wherein is best shown the general features and use of the invention, the vehicle spring member, designated generally by the reference numeral 10, is shown in use with a vehicle 11. The vehicle is shown as a baby stroller, but it could conceivably be a baby carriage or other light vehicle of a similar type. The vehicle consists of a seat 12 mounted on a frame 13 which has a rearwardly-inclined handle 14 connected to a horizontal tubular support member 15 which has longitudinal horizontal sections 16 at the sides. Transverse axles 17 extend under the support member 15 and are provided at their extremities with wheels 18 exteriorly of the longitudinal sections 16. At the four positions wherein an axle underlies a longitudinal section 16 of the support member 15 a spring member 10 joins the two; the spring members are the sole structural connection between the frame of the vehicle and the axles.

In Figure 2, it can be seen that the vehicle spring member consists of an outer member 20 joined to the longitudinal section 16 by means of rivets 21 and an inner member 22 which is joined to the axle 17. A spring 27 is enclosed by the members 20 and 22.

As is best seen in Figure 4, the outer member 20 is formed of sheet metal and consists of a horizontal web 23 joining spaced parallel sides 24. At the rearward end the sides are provided with a circular segmental edge 25 and apertures 26 which lie on the center of the circle. The forward end is also provided with circular segmental edges 28 which are generally concentric with the apertures 26. Adjacent the forward ends the sides are provided with slots 29 which are concentric with the apertures 26, and of a width somewhat greater than the diameter of an axle 17. The inner member 22 is also shown particularly well in this same view of the drawings. It is formed of sheet metal and has a generally horizontal web 31 which joins vertical sides 32. The rearward end is provided with circular segmental edges 33 which are concentric with apertures 34 corresponding in size with the apertures 26 in the outer member 20. At the forward end, the sides of the inner member 22 are provided with edges 39 which are of the same curvature as the rearward edges 33; straight edges 35 lie opposite the web 31 and join the curved edges 33 and 39. The sides of the inner member are provided with apertures 36 having the same diameter as an axle 17 and being located concentrically of the forward curved edges 39. It should be noted that the distance from the aperture 26 to the center line of the slot 29 is the same as the distance between the apertures 34 and 36. A small aperture 37 is provided in the web 31; it is shown in Figures 2 and 4 and is intended to receive an end of the spring 27. The spring 27 consists of several well-spaced coils of suitably heat-treated wire. An end 38 extends tangentially away from the top of the coil cylinder in a longitudinal direction and is bent at a slight angle at its outer end; this bend is in a generally horizontal plane. The other end 40 of the spring extends tangentially away from the bottom of the coil cylinder; at the extreme end it is bent upwardly and then downwardly to define a curved portion 41 and a short vertical straight portion 42.

The spring member is assembled by placing the inner member 22 within the outer member 20 with the outer surfaces of the sides 32 of the former engaging snugly the inner surfaces of the sides 24 of the latter. The spring 27 is placed within the enclosure thus formed, with the main coil lying between the rearward ends; the coil is arranged with its axis aligned with the apertures 26 and 34. The radii of curvature of the rearward edges 25 and 33 are somewhat larger than the radius of the spring coil. The free end 38 of the spring extends along the web 23 of the outer member and the bend is such that the extreme end fits snugly in the corner formed by the web and a side 24 at the forward end. Thus, most of the end 38 resides a small distance away from the adjacent side 24 of the outer member 20 to provide a space for the reception of the upper edge of the corresponding side 32 of the inner member 22 under certain conditions. The other free end 40 lies in the corner formed by the web 31 of the inner member and one of its sides 32; the vertical portion 42 extends through the aperture 37 and the curved portion 41 curves upwardly away from the upper surface of the web 31. This connection between the spring and the inner member assures that little relative movement takes place between the two during normal operation. Then, a rivet 43 is passed through the apertures 26 and 34 and through the coil of the spring 27. The end is provided with a washer 44 and then it is headed over to fasten the assemblage together.

The operation of the invention will be readily understood in view of the above description. The vehicle spring member is used to join the frame of the vehicle to the axle, as has been stated. The outer member 20 is fixed to the longitudinal section 16. The axle 17 is passed through the slots 29 in the sides of the outer member 20 and through the apertures 36 in the sides of the inner member 22. A pre-loading is established in the spring and the axle normally resides in the lowermost part of the slot, thus maintaining the pre-loaded condition of the spring and preventing overloading below a predetermined amount. It is evident, then, that the outer member 20 moves with the frame of the vehicle, while the inner member moves with the axle. Since the two members are hinged together by the rivet 43, the effect of vertical relative movement between the frame and axle is an opening and closing of the forward end of the enclosure defined by the members; the action is similar to that of the jaws of an animal. Of course, any attempt of the inner and outer members to move toward one another is resisted by the spring 27. The pressures are absorbed by the entire length of the free end 38 which lies against the web 23 of the outer member 20 and by substantially the entire length of the other free end 40. Movement of these ends toward one another causes the coils of the spring to move axially toward one another. The spring is selected so that when the inner and outer members are at the extreme limit of their nesting movement and the axle 17 resides at the upper end of the slots 29, the coils still do not lie in touching relationship and the spring would be capable of resisting further stress if further movement were possible. It will be observed that every stress which is exerted on the spring by normal relative movement between the frame and the axle is received and absorbed by the entire spring; under no circumstances is a localized stress set up in the spring, nor are repeated reversals experienced that are of the type confined to a small area and that cause work hardening, incipient cracks and eventual failure.

Further, longitudinal relative loading between the axle and the frame is transmitted by the inner and outer members and their hinge rivet 43, and not through the spring. Also, so far as the entire vehicle is concerned, the positioning of the axles relative to the frame is positive and definite, thus eliminating failure of the wheels to track properly due to manufacturing tolerances permitted in such springs.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. A vehicle spring member comprising an outer member adapted to be attached to the frame of a vehicle, an inner member adapted to be attached to an axle of the vehicle, the inner and outer members being hingedly connected, a spring residing between the said members and adapted to resist relative hinging motion therebetween, the outer member being slotted to permit the axle to pass therethrough and to limit the movement between the inner and outer members.

2. A spring member for use in joining a frame and an axle of a vehicle comprising an outer member having circular segmental sides joined by a web, the web being adapted to be attached to the frame, an inner member having sides joined by a web, the web being adapted to be attached to the axle, the inner and outer members being hingedly connected on a hinge axis at the narrow part of the sides of the outer member and considerably spaced from the points of attachment of the respective members to the frame and axle, the members being nested with the outer surfaces of the sides of the inner member sliding along the inner surfaces of the sides of the outer members, a spring residing between the said members and connected to resist relative hinging motion therebetween, the outer member being slotted to permit the axle to pass therethrough and to permit the said movement without interference between the axle and the outer member.

3. A spring member for use in joining a frame and an axle of a vehicle comprising an outer member having sides joined by a web, the web being adapted to be attached to the frame, an inner member having sides joined by a web, the web being adapted to be attached to the axle, the inner and outer members being hingedly connected on a hinge axis considerably spaced from the points of attachment of the respective members to the frame and axle, the members being nested with the outer surfaces of the sides of the inner member sliding along the inner surfaces of the sides of the outer member, a spring residing between the said members and consisting of a coil having elongated, substantially straight ends each of which presses against one of the members to resist relative hinging motion therebetween, the outer member being slotted to permit the axle to pass therethrough and to permit the said movement without interference between the axle and the outer member.

4. A vehicle spring member comprising an outer member adapted to be attached to the frame of a vehicle, an inner member adapted to be attached to an axle of the vehicle, the inner and outer members being hingedly connected, a spring residing between the said members and adapted to resist relative hinging motion therebetween, the outer member being slotted to permit the axle to pass therethrough and to limit the movement between the inner and outer members, the said spring consisting of a coil having elongated, substantially straight ends each of which presses against one of the members.

5. A vehicle spring member comprising an outer member adapted to be attached to the frame of a vehicle, an inner member adapted to be attached to an axle of the vehicle, the inner and outer members being hingedly connected on a hinge axis considerably spaced from the points of attachment of the respective members to the frame and the axle, a coil spring residing between the said members and adapted to resist in torsion relative hinging motion therebetween, the outer member being slotted to permit the axle to pass therethrough and to limit the movement between the inner and outer members.

References Cited in the file of this patent

UNITED STATES PATENTS

| | | |
|---|---|---|
| 1,858,783 | Masury | May 17, 1932 |
| 2,472,686 | Snyder | June 7, 1949 |

FOREIGN PATENTS

| | | |
|---|---|---|
| 313,896 | Great Britain | June 17, 1929 |
| 434,161 | Great Britain | Aug. 27, 1935 |